Nov. 20, 1928.

A. A. COCHRAN 1,692,077

RADIAL STAY TONGS

Filed Jan. 23, 1926

Witness:
R. C. Hamilton

INVENTOR.
Arthur A. Cochran
BY Elwin T. Smith
ATTORNEY.

Patented Nov. 20, 1928.

1,692,077

UNITED STATES PATENT OFFICE.

ARTHUR A. COCHRAN, OF CHANUTE, KANSAS.

RADIAL STAY TONGS.

Application filed January 23, 1926. Serial No. 83,295.

My invention relates to radial stay tongs and more particularly to such tongs adapted for boiler repairing.

In repairing boilers, particularly locomotive boilers, it is frequently necessary to remove the radial stay bolts located in the water space of such boilers and extending from the outer shell of said boilers to the crown sheet. In removing such stays the same are cut loose from the outer shell and from the crown sheet of the boiler, by any suitable means, such as a torch, the removal of the stays leaving a small opening in the outer shell of the boiler, where each stay has been cut loose.

In removing the stays or stay bolts from the interior of the boiler through the wash out holes thereof, it has frequently required a fishing operation with wire, which is very cumbersome, and it is accordingly a purpose of my invention to provide a tool for insertion through the small openings made when the stays are cut loose, adapted to engage said stays to manipulate the same so as to place the stays in proper position to be engaged by tongs inserted through the wash out hole for removal through said wash out hole.

It is a further purpose of my invention to provide a tool for handling objects through small openings, where the same can not be reached by hand, said tool comprising a pair of elongated shank members, having jaws on the ends thereof, and means for rotating one of said shank members about its axis to move one of said jaws toward and away from the other jaw, and furthermore, to provide such a tool with means for holding the jaws thereof in closed position, said means being located so as to be readily accessible to the operator.
Other objects and advantages of the invention will appear as the description of the drawings proceeds. It is to be understood, however, that I do not intend to limit myself to the exact details shown or described, but that I intend to include as part of my invention all such obvious changes and modifications as would occur to a person skilled in this art and as would fall within the scope of the claims.
In the drawings:

Figure 1:
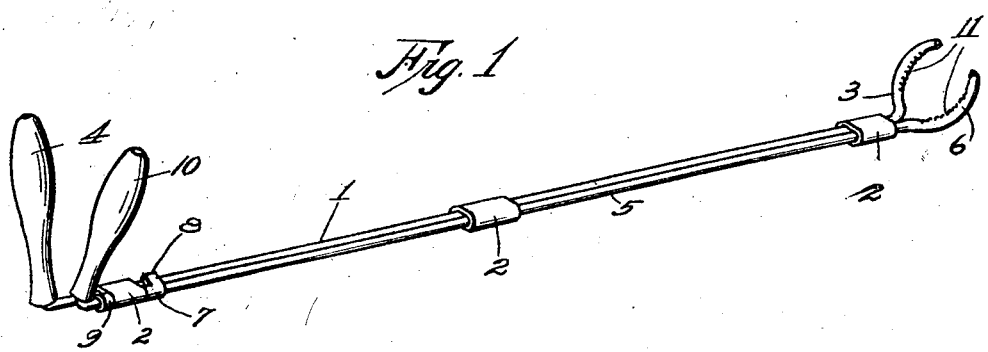
Fig. 1 is a perspective view of my improved tongs.
Figure 2:
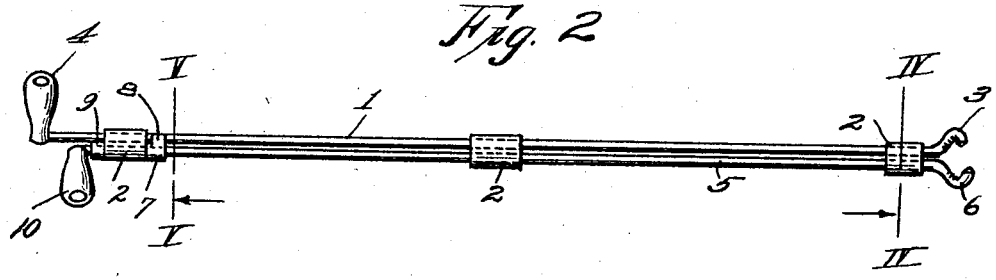
Fig. 2 is a plan view thereof.

Referring in detail to the drawings, my improved tongs comprise a pair of rodlike shank members 1 and 5 secured in assembled relation by means of the members 2, so that said members 1 and 5 extend in substantial parallelism to each other. The shank member 1 is held in fixed position relative to the members 2, passing through openings therein and being secured in said openings in any desired manner, as by welding. The shank member 5 extends through suitable openings in the bracket members 2, but is rotatable therein.

The member 1 is provided with an arcuate end portion 3 and the member 5 is provided with an arcuate end portion 6, said arcuate end portions 3 and 6 being curved in opposite directions to provide a pair of jaws, said jaws being provided with serrations or teeth 11 on the concave sides thereof. The members 1 and 5 are provided respectively with handle members 4 and 10, extending preferably substantially at right angles to the longitudinal axes of the shank portions.

Figures 3, 4:
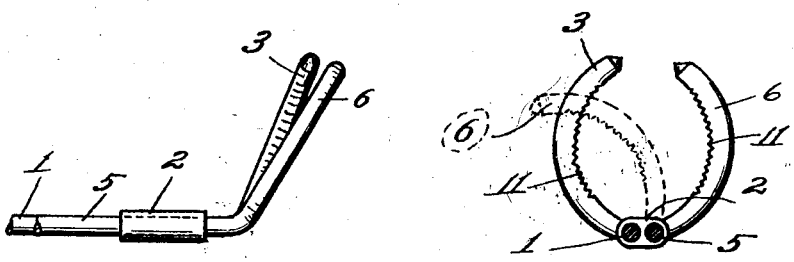
Fig. 3 is a fragmentary enlarged elevational view thereof.
Fig. 4 is a section taken on the line IV—IV of Fig. 2.
Figure 5:
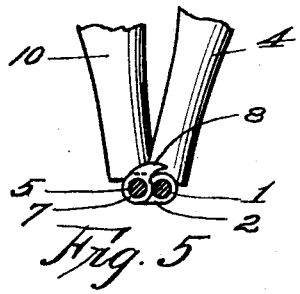
Fig. 5 is an enlarged section partly broken away taken on the line V—V of Fig. 2.

The jaws or arcuate end portions of the members designated by the numerals 3 and 6 extend outwardly at an oblique angle to the longitudinal axes of the members 1 and 5 as will be evident from Fig. 3, and the jaw 3 preferably extends at a slightly greater angle to the axis of the member 1 than the jaw 6 does to the axis of the member 5, so as to enable the jaw 6 to swing past the jaw 3 into the dotted line position thereof shown in Fig. 4. The longitudinal movement of the member 5 relative to the members 2 is prevented due to the provision of the sleeves 7 and 9 on the member 5 lying on opposite sides of the member 2 adjacent the handles 4 and 10, said sleeves being firmly secured in fixed position on the member 5 in any suitable manner, as by welding. The sleeve member 7 is provided with a tapering curved extension 8 shaped similarly to a pawl, which projects toward the member 1, and is adapted to engage with the same to limit the closing movement of the jaws 3 and 6.

As previously stated, the tool is provided for the purpose of removing radial stays from locomotive boilers, and due to its peculiar shape may be inserted through a very small opening when the jaws are in the dotted line position shown in Fig. 4. After being passed through the small hole in the boiler shell referred to above, the jaws are opened to any desired extent by manipulation of the handles 4 and 10, and engaged with the stay bolt to be removed. Owing to the angularity of the jaws the radial stay bolts can be encircled by the jaws, and moved to any desired position in the boiler, no matter in what position the same may lie, this being possible even when the same are lying horizontally on the crown sheet.

Having thus described my invention, what I desire to claim and secure by United States Letters Patent is:

1. A tool of the character described, comprising a pair of elongated substantially parallel shank members, means connecting said members, one of said members being mounted for rotation on its axis, obliquely extending jaws on one end of said shank members, one of said jaws extending at a slightly different angle to the axis of its shank member than said other jaw, whereby said jaws are adapted to be moved into overlapping relation upon rotation of one of said shank members, and means for moving said shank members relative to each other.

2. A tool of the character described, comprising a pair of elongated shank members, spaced bearing means carried by one of said members connecting said members, the other of said members being rotatable on its axis relative to said first member, obliquely extending arcuate jaws on one end of said shank members, one of said jaws extending at a slightly different angle to the axis of its shank member than said other jaw, whereby said jaws are adapted to be moved into overlapping relation upon rotation of said shank member on its axis, and operating means on the other end of said shank members.

ARTHUR A. COCHRAN.